United States Patent [19]
Clendenen

[11] 3,776,744
[45] Dec. 4, 1973

[54] ALUMINA-TRANSITION METAL OXIDE CERAMIC PRODUCTS OF ENHANCED DUCTILITY

[75] Inventor: Ronald L. Clendenen, Orinda, Calif.

[73] Assignee: Shell Oil Company, Houston, Tex.

[22] Filed: June 15, 1972

[21] Appl. No.: 263,014

Related U.S. Application Data

[63] Continuation-in-part of Ser. No. 74,181, Sept. 21, 1970, abandoned, which is a continuation-in-part of Ser. No. 735,541, June 10, 1968, abandoned.

[52] U.S. Cl................... 106/73.4, 106/65, 106/66, 264/65, 264/66, 264/332
[51] Int. Cl. ...................... C04b 35/10, C04b 35/60
[58] Field of Search...................... 106/73.4, 65, 45, 106/46, 66; 264/65, 332, 66

[56] References Cited
UNITED STATES PATENTS

| | | | |
|---|---|---|---|
| 2,369,709 | 2/1945 | Baumann et al.................. | 106/66 X |
| 3,379,523 | 4/1968 | Das Chaklader .................. | 264/332 |
| 3,549,400 | 12/1970 | Lachman.............................. | 106/65 |
| 3,702,881 | 11/1972 | Das Chaklader ................... | 264/332 |
| 3,442,994 | 5/1969 | Herbert................................ | 264/66 |
| 3,676,079 | 7/1972 | Morgan............................... | 264/332 |

FOREIGN PATENTS OR APPLICATIONS

| | | | |
|---|---|---|---|
| 506,964 | 6/1939 | Great Britain..................... | 106/73.4 |

*Primary Examiner*—Helen M. McCarthy
*Attorney*—Howard W. Haworth et al.

[57] ABSTRACT

High-density, finely grained aluminous ceramic compositions are produced by maintaining mixtures of finely divided alumina precursors and transition metal oxide precursors under pressure at a temperature high enough to decompose the precursors to ceramic oxides but below the melting point of the resulting ceramic oxide composition. The novel ceramic compositions produced by this process are characterized by enhanced ductility at temperatures below their melting points, and are therefore useful in the production of ceramic objects by deformation processes of hot forming and the like. They can be heated to temperatures nearer their melting points for crystal growth and creep-resistance.

3 Claims, No Drawings

ALUMINA-TRANSITION METAL OXIDE CERAMIC PRODUCTS OF ENHANCED DUCTILITY

This application is a continuation-in-part of copending application Ser. No. 74,181, filed Sept. 21, 1970, which in turn is a continuation-in-part of Ser. No. 735,541, filed June 10, 1968 and both now abandoned.

BACKGROUND OF THE INVENTION

This invention relates to aluminous ceramic compositions. More particularly, it relates to dense, finely-grained, plastic, multi-component ceramic compositions and a decompositive hot-pressing process for their manufacture. It also relates to processes of deforming the ceramic compositions under relatively mild conditions of temperature and pressure.

A variety of processes are used for forming ceramic objects. Typical processes are, for example, slip-casting followed by firing, ceramic oxide powder pressing followed by sintering, and hot pressing of ceramic oxide powders. The process chosen for the production of a ceramic object depends to a large extent on the properties desired of the ceramic product. Slip-casting/firing is often employed in the manufacture of ceramic kitchen articles and bathroom fixtures, where low fabrication costs more than offset the lack of dimensional precision and the porous, low density, low brittle-strength product inherent in the process. When a dense, harder, dimensionally accurate ceramic product is desired, pressing and hot pressing are often employed. Thus, pressing or hot pressing of a body of a powdered ceramic oxide or a body of porous ceramic oxide contemplates changing the shape of the body by reducing its density, that is, closing up or reducing the pores by a process of compaction. Conventionally, pressing can involve forming a powder of ceramic oxide into the desired shape with a press and die and then sintering the shaped article. With hot pressing, pressure is applied during the sintering. Conventional hot pressing processes require temperatures at or very near the melting point of the ceramic material, typically 1,400°C or higher. These temperatures severely limit the process utility, since they require the use of dies or working surfaces of graphite, zirconia, or other specialty materials and preclude the use of metal surfaces. Also, products of conventional hot pressing processes can only be further shaped, if desired, at these extremely high temperatures.

A modified hot pressing process which avoids the conventional high temperatures is disclosed in U.S. Pat. No. 3,379,523 issued Apr. 23, 1968 to Chaklader. In this process, decomposable starting materials are decomposed under pressure at temperatures from 300°C to 1,000°C to give ceramic products such as zirconia. This process generally employs single decomposable substances or mixtures of one decomposable substance and a metal as starting materials. This process has the disadvantage, when used to prepare aluminous products from aluminum hydroxide, for example, that at the temperatures specified a relatively low density product is produced. The products of this process also, as with conventional hot pressed products, can only be further shaped at temperatures very near their melting point, i.e., in the case of alumina, 1,800°–2,000°C. These temperatures are from about 0.90 to about 0.98 of the absolute melting temperature of the ceramic product.

STATEMENT OF THE INVENTION

It has now been found that when certain intimate uniform mixtures of finely divided, decomposable aluminum compounds and decomposable compounds of transition metals, especially iron, chromium, and/or titanium, are maintained under pressure of from 3,000 to 10,000 psig and at a temperature within a critical range substantially below the melting point, novel aluminous ceramic compositions of improved physical properties are produced. The resulting ceramic compositions are characterized by a high density and a fine grain size. They are capable of being deformed, by virtue of their properties of high plasticity and ductility, at temperatures substantially below their melting point.

DESCRIPTION OF PREFERRED EMBODIMENTS

The ductile ceramic compositions produced by the process of this invention comprise mixtures of at least 50% by weight of aluminum oxide, i.e., alumina, and at least 5% by weight of oxide of at least one transition metal. Iron, chromium and titanium are preferred transition metals. The compositions, in all cases, will have a substantial proportion of aluminum oxide, e.g., from about 50% by weight to 95% by weight, preferably from about 50% by weight to about 85% by weight, based on the total ceramic composition. In preferred two-component systems, iron oxide, chromium oxide, or titanium oxide will be present in conjunction with the alumina in an amount of from about 50% by weight to about 5% by weight, most preferably from about 50% by weight to about 15% by weight, based on the total ceramic composition. Illustrative two-component mixed oxide ceramic compositions are 50% alumina-50% ferric oxide, 75% alumina-25% chromic oxide, 80% alumina-20% titanium dioxide, 95% alumina-5% titanium dioxide, and 85% alumina-15% ferric oxide.

In some instances, advantageous properties are imparted to the ceramic composition by incorporating therein a minor proportion of an additional metal oxide of the group iron oxide, chromium oxide, and titanium oxide, thus making a three-component mixture. Illustrative three-component mixed oxide ceramic compositions are 50% alumina-45% ferric oxide-5% titanium dioxide, 80% alumina-15% ferric oxide-5% titanium dioxide, 70% alumina-15% chromic oxide-15% iron oxide, and 90% alumina-8% ferric oxide-2% titanium dioxide. In general, ceramic compositions consisting essentially of alumina and iron oxide or of alumina, iron oxide and titanium dioxide are preferred. Ceramic compositions consisting essentially from 0 to 5% by weight of titanium dioxide, 15 to 50% by weight of ferric oxide and 50 to 85% by weight of alumina based on the total ceramic composition are especially useful and are particularly preferred.

The mixed metal oxide ceramic compositions of the invention are produced from mixtures of compounds of the metals other than their oxides but which compounds decompose to be oxides at temperatures below the temperature at which the ceramic compositions are produced. Thus, the ceramic oxide compositions are prepared by heating under pressure intimate, uniform mixtures of finely-grained solid particles of decomposable compounds of aluminum and at least one decomposable compound of transition metals of the group iron, chromium and titanium, to a temperature at which these compounds decompose to give oxides.

Suitable decomposable compounds of aluminum, iron, chromium and titanium are the hydroxides, carbonates and oxalates. The exact proportions of the mixtures of decomposable substances are selected to provide the two- and three-component aluminous ceramic oxide products herein before described following decomposition. For example, to prepare a ceramic product containing 85% by weight of alumina and 15% by weight of iron oxide, any of the following typical mixtures of decomposable compounds of aluminum and iron might be used.

88%w $Al(OH)_3$ — 12%w $Fe(OH)_3$
89%w $Al_2(CO_3)_3$ — 11%w $FeCO_3H_{20}$
88%w $Al_2(C_2O_4)_3$ — 12%w $Fe_2(C_2O_4)_3$
81%w $Al(OH)_3$ — 19%w $Fe_2(C_2O_4)_3$

As another example, to produce ceramic products containing 5% by weight of titanium dioxide, 15% by weight of iron oxide and 80% by weight of aluminum oxide, mixtures of decomposable compounds such as the following are very suitable:

81%w $Al(OH)_3$ — 14.2%w $Fe(OH)_3$ — 3.8%w $Ti(OH)_3$
85.5%w $Al_2(CO_3)_5$ — 11.7%w $FeCO_3 \cdot H_2O$ — 2.8%w $Ti(OH)_3$
78.3%w $Al_2(C_2O_4)_3$ — 11.1%w $Fe_2(C_2O_4)_3$ — 10.6%w $Ti(C_2O_4)_3 \cdot 1OH_2O$ The decomposable metal compounds are suitably prepared separately and then intimately mixed or are initially produced in an intimate mixture as by co-precipitating a mixture of metal hydroxides or carbonates from an aqueous solution.

Regardless of the method by which the intimate mixtures of metal oxide precursors are obtained, it is important that the materials be of a fine-grain structure. The average grain size of the ceramic compositions and therefore of the metal oxide precursors, should be no more than about 3 microns in diameter and preferably no more than about 1 micron in diameter. Particles of the proper grain size are frequently produced by the above coprecipitation technique and no further treatment is necessary. In the instances where the grain size is too large, conventional methods of attrition such as ball-milling are suitable for reduction of grain size.

The mixture of finely grained particles of metal oxide precursors is subjected to elevated pressure and a controlled elevated temperature which serve to effect the conversion of oxide precursor to oxide and to form the ceramic oxide compositions. Suitable pressures vary from about 3000 psig to about 10,000 psig with the pressure range from about 4,000 psig to about 8,000 psig being preferred. The optimum temperature to be employed will depend upon the physical properties of the ceramic composition precursor, particularly upon the decomposition point. Although the absolute value of the optimum temperature will vary widely with the nature of the mixed oxides, it has been found that best results are obtained when a temperature is employed which is from about 45% to about 75%, preferably from about 55% to about 75%, of the temperature at which the metal oxide mixture would begin to melt. The melting point will vary with the composition but is easily determined experimentally if not already known. From this value, the optimum range for the particular ceramic composition is calculated. By way of illustration, the melting point of a 50—50 mixture of alumina and ferric oxide is about 1,600°C. Suitable temperatures, in this instance, will vary from about 750°C to about 1,200°C with the preferred range being from about 800°C to about 1,100°C. Table I lists, for purposes of illustration, temperature ranges preferred with other compositions according to the invention. It is preferred to reach the desired temperature gradually over a period of time. A controlled heating rate of about 300°C to 500°C per hour is satisfactory although higher or lower rates are usefully employed on occasion.

TABLE I
SUITABLE CERAMIC FORMING AND PROCESSING TEMPERATURES

| Ceramic Composition | Suitable Temperatures |
|---|---|
| 15% $Fe_2O_3$ 85% $Al_2O_3$ | 1,000°–1,250°C |
| 15% $Cr_2O_3$ 85% $Al_2O_3$ | 1,000°–1,500°C |
| 2% $TiO_2$ 20% $Cr_2O_3$ 78% $Al_2O_3$ | 900°–1,200°C |
| 25% $Fe_2O_3$ 75% $Al_2O_3$ | 950°–1,200°C |

The resulting compositions are dense, compact, solid bodies characterized by a high density which approaches the theoretical maximum, e.g., at least about 85% of the theoretical maximum density, more often at least about 95% and on occasion over 99% of the theoretical maximum density. Moreover, at the conditions of elevated pressure and temperature, such as those at which they are formed, the ceramic compositions are characterized by a high degree of ductility and plasticity, being deformable without fracture at strain rates of at least 10% per minute and frequently of up to 100% per minute under stress loads, i.e., deforming pressures, of from about 3,000 psig to about 10,000 psig, with total strains of up to 70%. The terms "deformation" or "deforming" contemplate substantially changing the shape of a ceramic body in more than one dimension without necessarily substantially changing the density of the body. Thus, the ceramic compositions are deformed by hot-rolling through flat or shaped rollers into flat strips, bars, rods or other articles of desired shape and dimension at temperatures sufficiently low to enable use of metal dies or working surfaces. Conventional techniques of extrusion are also applied to deform these ceramic compositions to fabricate tubes and other articles of more complex cross-sectional areas. Because of the high density of the ceramics, little if any observable contraction takes place on return of the ceramic materials to ambient temperature. Thus, ceramic articles are heat-formed from the present ceramic compositions with dimensions quite close to those ultimately desired and yet the compositions substantially retain those dimensions upon cooling. As a result, the ceramic compositions of the invention are particularly useful in the production, by deforming techniques of forging and stamping and deep drawing of shaped ceramic articles, e.g., furnaces, crucibles and the like, where dimensional control is required and properties of strength and resistance to chemical attack are important. Subsequent to forming the ceramic products into the desired shape, the ductility can be removed by maintaining the products at higher temperatures, e.g., 80% to 90% of the melting temperature, to grow larger grain and impart high-temperature creep-resistance to the products.

To further illustrate the novel compositions of the invention, their production and deformation, the following examples are provided. It should be understood that the details thereof are not to be regarded as limitations as they may be varied as will be understood by one skilled in this art.

EXAMPLE I

A series of alumina-transition metal oxide ceramic compositions was produced by coprecipitating aluminum and transition metal hydroxides with aqueous ammonia from aqueous solutions of the metal nitrates of calculated concentration. Each precipitate was filtered and dried at 50°C to remove free water and placed in a piston-cylinder graphite die. The die was pressurized and heated at a controlled heating rate to calcine and sinter the ceramic. The ceramic products thus formed had a very fine grain structure, of the order of one micron. The compositions of ceramic products thus produced are listed in Table II, together with the pressure and final temperature of their production and the heating rate employed. The term "$T/T_m$" measures the ratio of the temperature employed to the melting temperature and the term "$d_f/d_{theor}$" measures the ratio of the actual density of the ceramic to the theoretical density.

TABLE II

| Product | Composition % wt | Pressure psig | Temp. °C | Heating Rate °C/Hr | $T/T_m$ | $d_f/d_{theor}$ |
|---|---|---|---|---|---|---|
| A | 50% Al₂O₃ 50% Fe₂O₃ | 4,000 | 1,100 | 500 | 0.70 | >0.99 |
| B | 50% Al₂O₃ 50% Fe₂O₃ | 8,000 | 1,100 | 300 | 0.70 | >0.99 |
| C | 50% Al₂O₃ 50% Fe₂O₃ | 4,000 | 1,050 | 400 | 0.68 | 0.99 |
| D | 90% Al₂O₃ 10% TiO₂ | 4,000 | 900 | 400 | 0.55 | 0.85 |
| E | 85% Al₂O₃ 15% Fe₂O₃ | 4,000 | 1,150 | 400 | 0.63 | ~0.95 |
| F | 50% Al₂O₃ 50% Cr₂O₃ | 4,000 | 1,300 | 400 | 0.65 | 0.99 |
| G | 75% Al₂O₃ 25% Fe₂O₃ | 4,000 | 1,200 | 400 | 0.74 | 0.99 |
| H | 65% Al₂O₃ 35% Fe₂O₃ | 4,000 | 1,200 | 400 | 0.74 | >0.99 |
| I | 95% Al₂O₃ 5% Fe₂O₃ | 4,000 | 1,300 | 400 | 0.70 | 0.95 |
| J | 84% Al₂O₃ 14% Fe₂O₃ 2% TiO₂ | 4,000 | 1,100 | 400 | 0.60 | 0.96 |
| K | 85% Al₂O₃ 15% Fe₂O₃ | 3,000 | 950 | 400 | 0.55 | 0.85 |
| L | 74% Al₂O₃ 24% Fe₂O₃ 2% TiO₂ | 4,000 | 1,150 | 400 | 0.64 | 0.99 |
| M | 50% Al₂O₃ 30% Fe₂O₃ 20% Cr₂O₃ | 4,000 | 1,400 | 400 | 0.75 | 0.99 |
| N | 64% Al₂O₃ 34% Fe₂O₃ 2% TiO₂ | 4,000 | 1,100 | 400 | 0.62 | 0.99 |

EXAMPLE II

The ductility of ceramic products produced by the procedure of Example I was determined using specimens of one-fourth inch by one-fourth inch by one-half inch dimensions cut from samples previously produced. The specimens were placed in a graphite element furnace and heated from ambient atmospheric temperature (25°-30°C) to a temperature from 0.5 to 0.7 of the melting temperature, i.e., to a $T/T_m$ value of from 0.5 to 0.7, and pressure was applied to one end of the specimen to produce a constant strain rate. The products evaluated, the temperature of evaluation, the maximum strain rate without fracture, the pressure applied to maintain that strain rate, and the highest total strain without fracture are provided in Table III.

TABLE III

| Product | Temp. °C | $T/T_m$ | Pressure Applied at Strain Rate psi | Strain Rate %/min | Total Strain % |
|---|---|---|---|---|---|
| A | 1,100 | 0.71 | 3,000 | 100 | 70 |
| B | 1,000 | 0.66 | 8,000 | 70 | 70 |
| C | 900 | 0.61 | 18,000 | 20 | 40 |
| D | 1,200 | 0.70 | 8,000 | 20 | 22 |
| F | 1,300 | 0.65 | 30,000 | 20 | 25 |
| G | 1,200 | 0.74 | 10,000 | 20 | 60 |
| H | 1,200 | 0.74 | 10,000 | 10 | 70 |
| I | 1,300 | 0.70 | 10,000 | 20 | 25 |
| M | 1,400 | 0.75 | 6,000 | 20 | 50 |

In contrast to the large low temperature plastic deformations observed with products according to this invention, Heuer et al, 52, J. Am. Ceramic Soc., 468 (1969) show that aluminas prepared by conventional hot-pressing methods require temperatures of from 0.87 to 0.95 of absolute melting (i.e., 1,750°C - 1,920°C) to give strain rates of from 7 to 36%/min.

EXAMPLE III

Heating-treating to remove ductility

A sample of product A, Table II, (50% Al₂O₃-50% Fe₂O₃) was annealed at 1,300°C ($T/T_m = 0.81$) for 72 hours. Studies of fracture surfaces of this material with an electron microscope indicated that prior to annealing this material had a grain size of the order of 0.1 microns whereas after annealing the grain size had grown to some 50 to 100 microns in diameter. When tested under the same conditions as product A, Table III, line 2 (1,000°C at a strain rate of 70%/min) this material evidenced no plastic deformation in contrast to a 70% plastic deformation observed prior to annealing.

EXAMPLE IV

A body of pure alumina was prepared in accord with the general procedure of Example I. A solution of Al(NO₃)₃ was treated with NH₄OH to precipitate Al(OH)₃ which after washing and drying was placed in a piston-cylinder die and heated at 1,300°C and pressed at 4,000 psi to decompose the hydroxide and give a 95+% dense solid body of alumina. The ductility of this body of alumina was measured by the method of Example II of the above-noted patent application with the following result: at 1,200°C ($T/T_m = 0.62$), when a strain rate of 5%/minute was applied, no measurable deformation was noted up until a pressure of 12,000 psi was applied at which point the sample fractured.

EXAMPLE V

A sample of pure ferric oxide (Fe₂O₃) was prepared in accord with the general procedure of Example I by precipitating Fe(OH)₃ from Fe(NO₃)₃ with NH₄OH and then heating and pressing the Fe(OH)₃ at 1,110°C and 4,000 psi to give a 99+% dense Fe₂O₃ body. This body was tested by the method of Example II and found to exhibit no notable deformation below its melting point and fractured at 1,050°C when a pressure of 60,000 psi was reached. The strain rate employed was 5%.

EXAMPLE VI

A body of 90% alumina/10% zirconia was prepared in accord with the procedure of Example I by precipitating a mixture of Al(OH)₃ and Zr(OH)₃ and Zr(OH)₄ from a solution of the nitrates using NH$_4$OH and heating and pressing the mixed hydroxides at 1,400°C and 4,000 psi to give a 95+% dense body of 90% Al$_2$O$_3$/10% ZrO$_2$. This body was tested by the method of Example II and found to have no ductility at temperatures below its melting point, fracturing when a pressure of 32,000 psi was gradually applied at 1,300°C (T/T$_m$ = 0.67).

EXAMPLE VII

A body of pure alumina was prepared with general procedure of Example I by treating a solution of Al(NO$_3$)$_3$ with NH$_4$OH to precipitate Al(OH)$_3$ which after washing and drying was placed in a piston-cylinder die and heated at 1,300°C and pressed at 4,000 psi to decompose the hydroxide and give a 95+% dense solid body of alumina. The ductility of this body of alumina was measured by placing the body between the platens of a press, heating the body at 10°C/minute while applying a constant load of 4,000 psi. Strain rates were measured at hundred degree intervals and the first recordable deformation occurred at 1,600°C, (T/T$_m$) = 0.81, at a strain rate of 0.07%/min. At 1,700°C, (T/T$_m$) = 0.85, a strain rate of 1%/minute was recorded, and the sample fractured at 1,725°C, terminating the experiment.

EXAMPLE VIII

A sample of high density commercial alumina ceramic (General Electric Company's LUCALOX Ceramic) was placed under a constant load of 10,000 psi and heated to 1,800°C at a heating rate of 10°C/minute. The sample showed no noticeable deformation below 1,700°C and at 1,800°C, (T/T$_m$) = 0.9, the deformation rate was less than 1%/minute.

EXAMPLE IX

A sample of pure Fe$_2$O$_3$ was prepared in accord with Example V was tested. A constant load of 4,000 psi was applied and the heating rate was maintained at 10°C per minute. At 1,060°C, (T/T$_m$) = 0.72, a maximum strain rate of 0.6%/minute was observed and at 1,125°C, (T/T$_m$) = 0.75, the sample failed.

EXAMPLE X

A mixture of aluminum oxide and chromium oxide outside the range of mixtures claimed in this application, 4.8% Cr$_2$O$_3$ - 95% Al$_2$O$_3$, was prepared by the process of this invention and tested at a 4,000 psi constant load and a 10°C/minute heating rate. At (T/T$_m$) = 0.72 a deformation of 0.1%/minute was noted and at (T/T$_m$) = 0.78 a strain rate of 1% per minute was noted.

I claim as my invention:

1. A ceramic product consisting essentially of from 50% by weight to 85% by weight of aluminum oxide and from 15% by weight to 50% by weight of at least one oxide selected from the group consisting of ferric oxide, chromium oxide and titanium oxide, said composition having an average grain size of not more than 3 microns in diameter, a density of at least 95% of the theoretical maximum and further characterized as being deformable without fracture at strain rates of at least 10% per minute at temperatures in the range of from 55% to 75% of its melting temperature.

2. The ceramic product of claim 1 wherein the oxide selected from the group consisting of ferric oxide, chromium oxide and titanium oxide is ferric oxide.

3. The ceramic product of claim 1 wherein the oxide selected from the group consisting of ferric oxide, chromium oxide and titanium oxide is chromium oxide.

* * * * *